W. D. M. HOWARD.
AUTOMATIC AUTOMOTIVE TRANSMISSION.
APPLICATION FILED JULY 1, 1918.
1,335,169.
Patented Mar. 30, 1920.
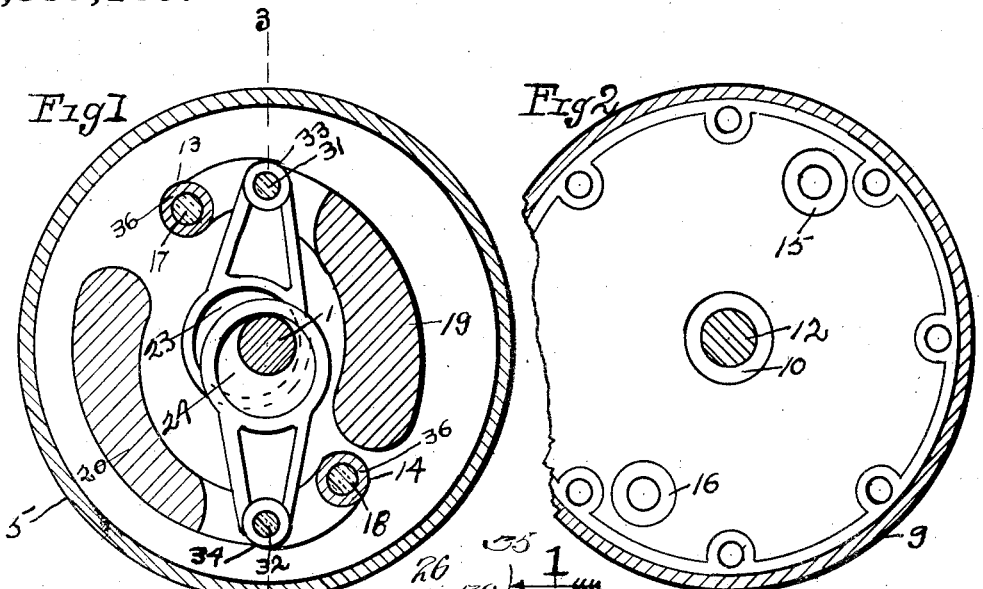
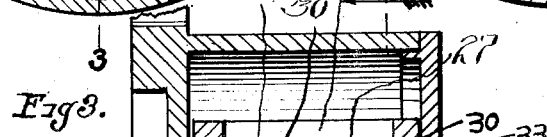
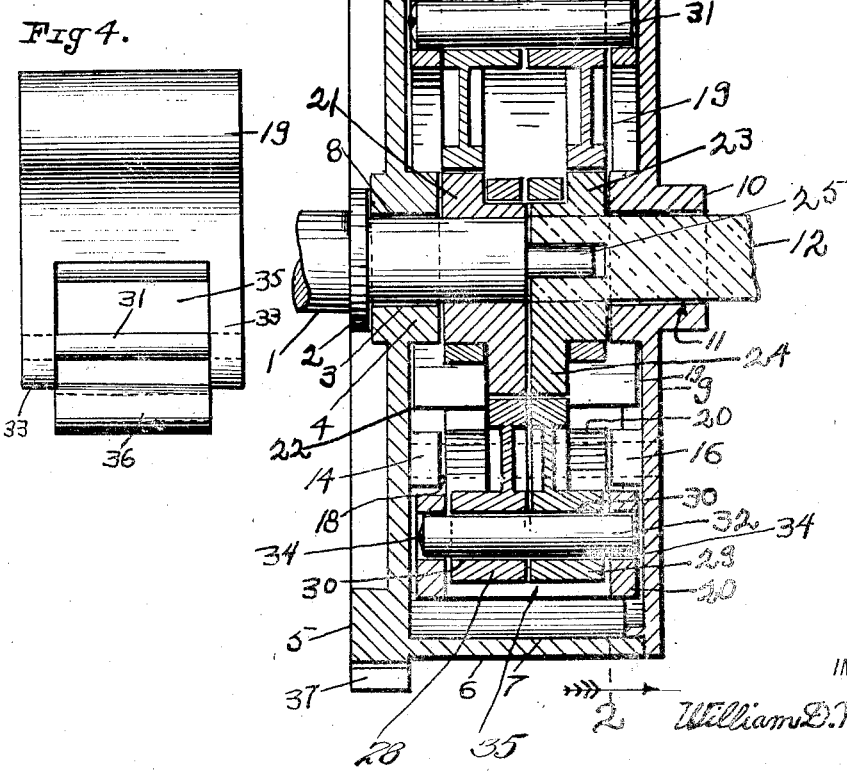
INVENTOR
William D. M. Howard.

UNITED STATES PATENT OFFICE.

WILLIAM D. M. HOWARD, OF BOSTON, MASSACHUSETTS.

AUTOMATIC AUTOMOTIVE TRANSMISSION.

1,335,169.   Specification of Letters Patent.   Patented Mar. 30, 1920.

Application filed July 1, 1918. Serial No. 242,849.

*To all whom it may concern:*

Be it known that I, WILLIAM D. M. HOWARD, a citizen of the United States, and a resident of the city of Boston, county of Suffolk, and State of Massachusetts, have made certain new and useful Improvements in the Art of Transmitting Power with Variable Speed and Force in an Automatic Automotive Transmission; and I do hereby declare the following to be a full, clear, concise, and exact description of the same.

This invention relates to a power-transmitting apparatus constructed to transmit power from a driving to a driven shaft and it has particular reference to a transmission capable of use in automobiles and similar vehicles in which the prime mover is an internal combustion engine.

My improved transmission is constructed so that the power will be transmitted at variable speeds and turning torque, depending on the variation in the load.

In order to give an understanding of my invention, I have illustrated in the drawing a selected embodiment thereof which will now be described, after which the novel features will be pointed out in the appended claims.

Figure 1 is a section on the line 1—2, Fig. 3, looking toward the left;

Fig. 2 is a section on the same line 1—2, Fig. 3, looking toward the right;

Fig. 3 is an enlarged section on the line 3—3, Fig. 1;

Fig. 4 is a plan view of one of the centrifugal weights.

In the device shown in the drawings, 1 indicates the driving shaft which is connected to the prime mover and 12 is the driven shaft, said shafts being arranged in alinement. In case the device is used for transmission in an automobile, the shaft 1 might be an extension of the crank shaft of the gas engine and the shaft 12 would be the shaft which extends to the differential.

The shaft 1 is shown as provided with a collar 2 and an extension 3, the latter having a further extension 25 that is received in an axial bore in the shaft 12 thereby to maintain the shafts in alinement.

Loosely mounted on the alined shafts is a fly-wheel element 5 which is provided with a flange or cylindrical case 6, the end of which is closed by a cover 9. This fly-wheel element is provided with the hubs 4 and 10 having apertures 8 and 11 in which the shafts 3 and 12 are journaled. The fly-wheel element thus constituted forms a chamber 7 in which the transmission mechanism is received. Situated within the chamber 7 are two centrifugal weights 19 and 20 which have the general construction shown in Fig. 4, that is, each weight is provided with the opening 35 at one end through which extends a pin (said pins being indicated at 31, 32, respectively), and each weight is also provided with an extension or hub 36 at its end which is journaled on a pin extending transversely of the chamber 7, the pins for the weights being indicated at 17 and 18, respectively. The pin 17 for the weight 19 is supported at its ends in two bosses 13 and 15 formed on opposite walls of the chamber 7, and the pin 18 for the weight 20 is supported in two bosses 14 and 16 also formed on opposite walls of the chamber 7.

The drive shaft extension 3 has rigidly mounted thereon at its inner end two eccentric members 21, 22 which are arranged so that their major diameters are at an angle of 90° to each other. The inner end of the driven shaft 12 is also provided with two eccentrics 23 and 24 which are arranged with their major diameters at 90° apart. The cams 21, 23 are connected by eccentric links 26 and 29 to the pin 31 carried by the weight 19, and the eccentrics 22 and 24 are connected by the eccentric links 27, 28 to the pin 32 which is carried by the weight 20.

The device operates as follows:

When the drive shaft 1 is rotated, the eccentrics 21 and 22 rotate therewith and such rotation will tend to reciprocate the eccentric links 26, 28 thereby to give oscillating movement to the weights 19 and 20, but such oscillating movement will be resisted by the eccentrics 23 and 24 on the shaft 12. If there is no load on the shaft 12, then the rotative movement of the driving shaft 1 will be transmitted to the shaft 12 through the mechanism above described, and both shafts together with the fly-wheel element will rotate as a unit. When a load is applied to the shaft 12 so that it tends to lag behind the shaft 1, then the relative change in angular position between the eccentrics 21 and 22 on the shaft 1 and the eccentrics 23, 24 on the shaft 12 will cause the flywheel element to rotate about the shaft at a speed which is the mean speed between that of the shaft 1 and the shaft 12, and during this rotative movement of the flywheel element the eccentric links will reciprocate and the weights 19, 20 will, therefore, have an oscillating movement. The difference of rotative speed of the drive shaft 1 and the driven shaft 12 is controlled by the centrifugal force of the weights 19 and 20 which is proportional to the rotative speed of the fly-wheel element, which is actuated by the difference of turning moment of the power applied to the drive shaft 1 and the inertia of the load to be moved by the driven shaft 12. The device is thus operated and controlled to vary the relative speeds of the drive shaft and driven shaft by the variable load to be moved by the driven shaft 12.

As stated above, when there is no load on the shaft 12, the entire apparatus rotates as a unit and the shaft 12 will rotate in unison with the shaft 1. Under these conditions, the weights 19 and 20 have no oscillating movement. The fly-wheel element 5 and the driven shaft 12 are thus rotating at a maximum speed, and when so operating the centrifugal force exerted by the weights 19 and 20 acting through compound leverage locks the eccentric links to their respective cams with a maximum force and produces a maximum turning torque to the driven shaft 12 at the time when most required to start the load from rest. If a load now be applied to the driven shaft 12, the links will start to reciprocate slowly. The speed of rotation of the fly-wheel element will decrease in proportion to the speed of the reciprocation of the links, and the centrifugal pull of the weights will decrease in like ratio, reducing the rotative speed of the driven shaft 12 and increasing the pulling rotative force in the same proportion. Under these conditions, the starting load having been overcome, the tractive force required to move the car decreases, allowing the fly-wheel element 5 to again increase its speed of rotation and thereby increase the centrifugal pull of the weights 19 and 20 which automatically increases the speed of rotation of the driven shaft 12 and thus accelerates the velocity of movement of the car.

This invention automatically balances the load torque to the power torque and is operated by the variable resistance of the load to be moved, permitting the gas engine to operate at a constant speed regardless of the variable load applied to the traction wheels and driving shaft of the transmission.

I claim:

1. In a power transmission apparatus, the combination with a driving shaft having two eccentrics rigid therewith, a driven shaft also having two eccentrics rigidly mounted thereon, a fly-wheel element free to revolve about said shafts, two weights pivoted to said element, and eccentric links on said eccentrics, one link of each pair associated with each shaft being connected with each weight.

2. In a power transmission apparatus, the combination with axially-alined driving and driven shafts, each having two eccentrics rigid therewith, a fly-wheel element free to revolve about said shafts, two weights pivoted at their ends to said fly-wheel element, and eccentric links on said eccentrics and connected to said weights intermediate of their ends.

3. In a power transmission apparatus, the combination with axially-alined driving and driven shafts, each having two eccentrics rigid therewith, a fly-wheel element free to revolve about said shafts, two weights pivoted at their ends to said fly-wheel element, and eccentric links on said eccentrics and connected to said weights intermediate of their ends, one link of each pair associated with each shaft being connected to each weight.

4. In a device of the class described, the combination with axially-alined driving and driven shafts, each having two eccentrics rigid therewith and arranged with their major axes 90° apart, of a fly-wheel element free to revolve about said shafts, two weights pivoted to said element, and eccentric links on said eccentrics connected to the weights, one link of each pair associated with each shaft being connected to each weight.

5. In a device of the class described, the combination with axially-alined driving and driven shafts, each having two eccentrics thereon situated 90° apart, of a chambered fly-wheel element free to revolve about said shafts, two weights pivoted to said element and situated within the chamber thereof, and eccentric links on said eccentrics connected to said weight.

6. In a drive mechanism, the combination with a drive shaft, and means for operating the same, eccentric cams associated and operating therewith, links radially extending therefrom and operated thereby, a shaft connecting alternate links associated with drive and driven cams, a driven shaft associated with the driven cams, a flywheel free to revolve around the drive and driven shafts, and containing a chamber in which the mechanism is mounted, centrifugal weights mounted in the flywheel on shafts rotating therewith, and forming a fulcrum point for the centrifugal action of the weights, journals formed in the weights receiving the transverse shafts connecting the associated links aforesaid, a cover mounted on the open face of the flywheel inclosing same, a journal formed at its center in which the driven shaft is free to rotate.

7. In an automatic drive mechanism, the combination with a drive shaft and means for operating the same, a driven shaft associated therewith, a flywheel free to revolve around the axis of the drive and driven shafts, a cover mounted on said flywheel inclosing a chamber therein, journals, formed in the hub of the flywheel and cover and axially in line, and to mount the drive and driven shafts respectively, twin eccentric cams having their major axis at 90 degrees offset mounted on the abutting ends of the drive and driven shafts, within the case, transverse shafts mounted in bearings integrally formed with the wall of the fly wheel and case, and axially in line, centrifugal weights mounted on said shafts, links connecting the cams in pairs with said weights, transverse shafts mounted in bearings of said weights and passing through journals formed in the head of said links.

8. In an automatic drive mechanism, the combination with a flywheel and means for operating the same, centrifugal weights associated with said flywheel and operated thereby, a drive shaft and a driven shaft mounted in journals of said flywheel having abutting ends and axially in line, cams mounted on the ends of said shafts, links associating the cams and centrifugal weights, and means for automatically varying the relative speed positions of the drive and driven shafts, said means being operatable by the centrifugal action of the weights and the load carried by the flywheel and the driven shaft.

9. In an automatic drive mechanism, the combination of a drive shaft and means for operating the same, a driven member associated with said drive member, and operated thereby, a flywheel associated with said drive and driven members and operated thereby, and means for automatically changing the relative speed positions of the driven member and flywheel in relation to the drive member, said means being controlled by the action of centrifugal force and operatable by the load carried by the driven member.

10. In a drive mechanism, the combination with a power shaft, a drive shaft, a driven shaft, a flywheel carried by the abutting ends of said drive shaft and driven shaft and rotatably and freely mounted thereon, eccentric cams mounted on the ends of said drive and driven shafts and moving therewith, and operatively mounted in journals formed in links, said links operating centrifugal weights mounted in a chamber inclosed in the flywheel to rotate the flywheel through transverse shafts mounting the weights to the flywheel and other transverse shafts connecting the links with their respective weights, to lock the links to the cams by the centrifugal action of the weights, to increase the speed of rotation of the flywheel by preventing the free reciprocation of the links, and permitting the driven links to seize the driven cams and rotate as a unit, to increase the speed of rotation of the driven shaft, in direct ratio to the decrease of the load moved thereby.

11. In a mechanism of the character disclosed, comprising a drive shaft and a driven shaft, rotatively mounted in journals of a containing flywheel, a drive eccentric cam or crank mounted on the drive member, a driven eccentric cam or crank mounted on the driven member, centrifugal weights mounted on transverse shafts mounted to rotate with the case, transverse shafts mounted across recess in the weights to receive the journaled ends of links, links connecting the weight shaft and the eccentric cams or cranks, means for enabling the inertia of the load on the driven shaft to lock the links from reciprocal motion thereby driving the case with a rotative motion around the axis of the drive and driven shafts at a speed variable to the difference between the positive moment of rotation of the drive member and the negative moment of rotation produced by the inertia of the load on the driven member.

12. In a mechanism of the character disclosed, a drive shaft, a driven shaft, a pair of drive eccentric cams having their throws at 90 degrees fixed on said drive shaft, a like pair of cams fixed on said driven shaft, and coaxial with, and rotatable with relation to said drive shaft, eccentric links mounted on said cams, a shaft connecting said links in pairs and journaled in their outwardly and radially extending heads, a pair of weights fixed to the said links by the shafts, a pair of transverse shafts forming a fulcrum point for said weights to bear on, and fixed to said flywheel case, to rotate same, and means whereby said drive shaft and driven shaft with their associated cams, links, weights, and connecting shafts, forming the equilibrium centrifugally controlled positively connecting mechanism, are rotated synchronously with each other.

13. In a mechanism of the character disclosed, a drive shaft, a driven shaft, a drive cam fixed on said drive shaft, a driven cam fixed on said driven shaft, and rotatable with relation to said drive shaft, an equilibrium flywheel forming a containing case, coaxial with, and rotatable with relation to said drive and driven cams, a transverse shaft journaled in said flywheel and rotating therewith, centrifugally actuated weights, journaled at their point of fulcrum on said transverse shafts, a shaft journaled in each of said equilibrium weights, a pair of eccentric links journaled on each of said latter shafts and connecting with the twin drive and driven eccentric cams, and journaled thereon, so that said cams are rotatable eccentrically therein, to reciprocate said links and oscillate said weights about their respective fulcrum points, when not prevented by the centrifugal pull of the weights, which forces rotation of the mechanism.

In testimony whereof I have affixed my signature in presence of two witnesses.

WILLIAM D. M. HOWARD.

Witnesses:
 HENRY S. WHEELER,
 WILLIAM B. THOMAS.